(12) United States Patent
Lynn

(10) Patent No.: US 6,896,721 B1
(45) Date of Patent: May 24, 2005

(54) MOTOR START-UP UNLOADING IN AN OXYGEN CONCENTRATOR

(75) Inventor: William Harry Lynn, Kohler, WI (US)

(73) Assignee: Thomas Industries Inc., Sheboygan, WI (US)

( * ) Notice: Subject to any disclaimer, the term of this patent is extended or adjusted under 35 U.S.C. 154(b) by 0 days.

(21) Appl. No.: 10/264,182

(22) Filed: Oct. 3, 2002

Related U.S. Application Data
(60) Provisional application No. 60/326,860, filed on Oct. 3, 2001.

(51) Int. Cl.[7] .............................................. B01D 53/047
(52) U.S. Cl. .......................................... 96/116; 96/130
(58) Field of Search .......................... 96/109, 115, 116, 96/121, 130, 143; 95/96; 55/418

(56) References Cited

U.S. PATENT DOCUMENTS

| | | | |
|---|---|---|---|
| 4,222,750 A | * | 9/1980 | Gauthier et al. .............. 95/102 |
| 4,331,455 A | | 5/1982 | Sato |
| 4,552,571 A | * | 11/1985 | Dechene ......................... 95/22 |
| 4,576,614 A | * | 3/1986 | Armond et al. ................ 95/23 |
| 4,627,860 A | * | 12/1986 | Rowland ....................... 96/111 |
| 4,813,979 A | * | 3/1989 | Miller et al. ................... 95/96 |
| 5,002,591 A | * | 3/1991 | Stanford ........................ 95/98 |
| 5,531,807 A | * | 7/1996 | McCombs ..................... 95/26 |
| 5,827,358 A | * | 10/1998 | Kulish et al. ................. 96/115 |

* cited by examiner

Primary Examiner—Frank M. Lawrence
(74) Attorney, Agent, or Firm—Quarles & Brady LLP

(57) ABSTRACT

An oxygen concentrator is controlled during start-up to rapidly shuttle the sieve beds between communication with the pump and atmospheric pressure, so the pressure in the sieve beds is relieved while the pump motor is starting up. After the start-up period, the sieve beds are alternately connected to the pump and atmospheric pressure for longer continuous periods.

6 Claims, 1 Drawing Sheet

MOTOR START-UP UNLOADING IN AN OXYGEN CONCENTRATOR

CROSS-REFERENCE TO RELATED APPLICATIONS

This claims the benefit of U.S. patent application Ser. No. 60/326,860 filed Oct. 3, 2001.

STATEMENT REGARDING FEDERALLY SPONSORED RESEARCH OR DEVELOPMENT

Not applicable.

FIELD OF THE INVENTION

This invention relates to oxygen concentrators, and in particular to operating the valving of an oxygen concentrator to unload the torque from the pump motor during start-up of the motor.

BACKGROUND OF THE INVENTION

Referring to FIG. 1, a pressure swing adsorption oxygen concentrator O typically uses two sieve bed containers S1, S2 connected at one end to a shuttle valve V and at the other end to an oxygen-enriched air storage tank T. The shuttle valve V, controlled by controller R, is used to alternate flow of air from a compressor C to each sieve bed S1, S2 in turn. As illustrated, air from the compressor C is being provided to the sieve bed S1, and the sieve bed S2 is being vented via line N2 to ambient atmospheric pressure, or line N2 could be connected to the intake of the compressor C to provide a negative pressure field in S2. When the valve V is shifted by controller R, bed S1 is connected to line N1, which vents to atmosphere or is connected to the compressor intake, and bed S2 is connected to compressor C, to pressurize bed S2 and vent bed S1.

In order to effect adsorption of nitrogen molecules from the air, the air flows through the sieve material of the bed being pressurized by the compressor and achieves a pressure over time as the sieve bed S1 or S2 fills with pressurized air. The end of the sieve bed opposite from the compressor C exhausts oxygen-enriched air into the storage tank T that is then connected to a patient at P by way of a device (not shown) that allows the patient to breath the oxygen-enriched air. FIG. 1 is a simplified view of a typical oxygen concentrator, it being understood that an oxygen concentrator may include many other components such as dehumidifiers, other valves, etc.

Once sufficient time at pressure is attained in the sieve beds S1 or S2 being pressurized by the compressor, the shuttle valve V is switched, typically through the action of a solenoid (i.e., it is typically a solenoid valve). This allows the first sieve bed to exhaust to atmosphere (or to the intake side of the pump as explained above) and in the process release the nitrogen molecules that were stored in the sieve as a portion of the oxygen-enriched air from the storage tank flows back through the sieve bed in the reverse direction. While the first sieve bed exhausts and is recharged, the second sieve bed receives air from the compressor and repeats the same process as the first sieve bed. The process is repeated as the shuttle valve again moves back to the first position causing the first sieve bed to be filled again and the second sieve bed to be recharged, and so on.

The compressors C most often used for oxygen concentrators are positive displacement, wobble-piston type reciprocating pumps. As a positive displacement device, the torque required of the motor driving the pump increases quickly during starting as pressure is generated, resulting from the filling of the sieve bed. Permanent split capacitor type motors are most often used partially due to their inherently high starting torque characteristics as compared to shaded-pole motors. If the pressure build-up could be minimized until the motor reached full running speed, the starting torque characteristics of less expensive motors, for example shaded pole motors, would be sufficient to operate the compressor. The resulting cost of the compressor could be significantly less using such motors instead of a higher starting torque motor. Thus, it would be desirable in an oxygen concentrator to relieve the pressure build-up long enough to allow a lower starting torque so as to bring the compressor up to a speed at which a lower starting torque motor can sustain operation without stalling.

Unloading devices are used in conjunction with compressors in systems where the compressor would otherwise be required to start against a back pressure load. Tank-mounted compressors are an example. Typically, a spring-actuated valve that is closed by an electromagnet during operation and opened by a spring is used to bleed off pressure in the line between the compressor head and the tank when the compressor power shuts off. In other systems a flow sensitive valve is used that opens the line from the compressor to the tank once flow is reduced as the compressor comes to a stop. Thus, it would be desirable to eliminate the need for a separate unloading valve of the types described, thereby further reducing the overall cost of an oxygen concentrator.

SUMMARY OF THE INVENTION

The invention provides a method of operating an oxygen concentrator by actuating the shuttle valve back and forth in relatively rapid succession during the starting of the compressor so as to prevent any substantial pressure build-up and thereby reduce motor start-up torque until the motor comes up to speed.

Control circuits that contain timing and/or pressure feedback signals are commonly used in oxygen concentrators to provide the appropriate timing for switching of the aforementioned shuttle valve to effect the efficient operation of the concentrator and achieve the desired level of oxygen enrichment at the required flow rates for the patient. The invention adds to the control system an additional timing subroutine for switching the shuttle valve back and forth just during starting of the compressor such that the back pressure build up in the sieve bed is kept sufficiently low so as not to impede starting of the compressor while a motor, which may be a relatively low starting torque motor, brings the compressor up to full running speed. Reducing the required starting torque also enables the use of a motor which runs more efficiently at the steady state operating load point.

These and other objects and advantages of the invention will be apparent from the detailed description and drawings.

DETAILED DESCRIPTION OF THE PREFERRED EMBODIMENT

Figure 1:
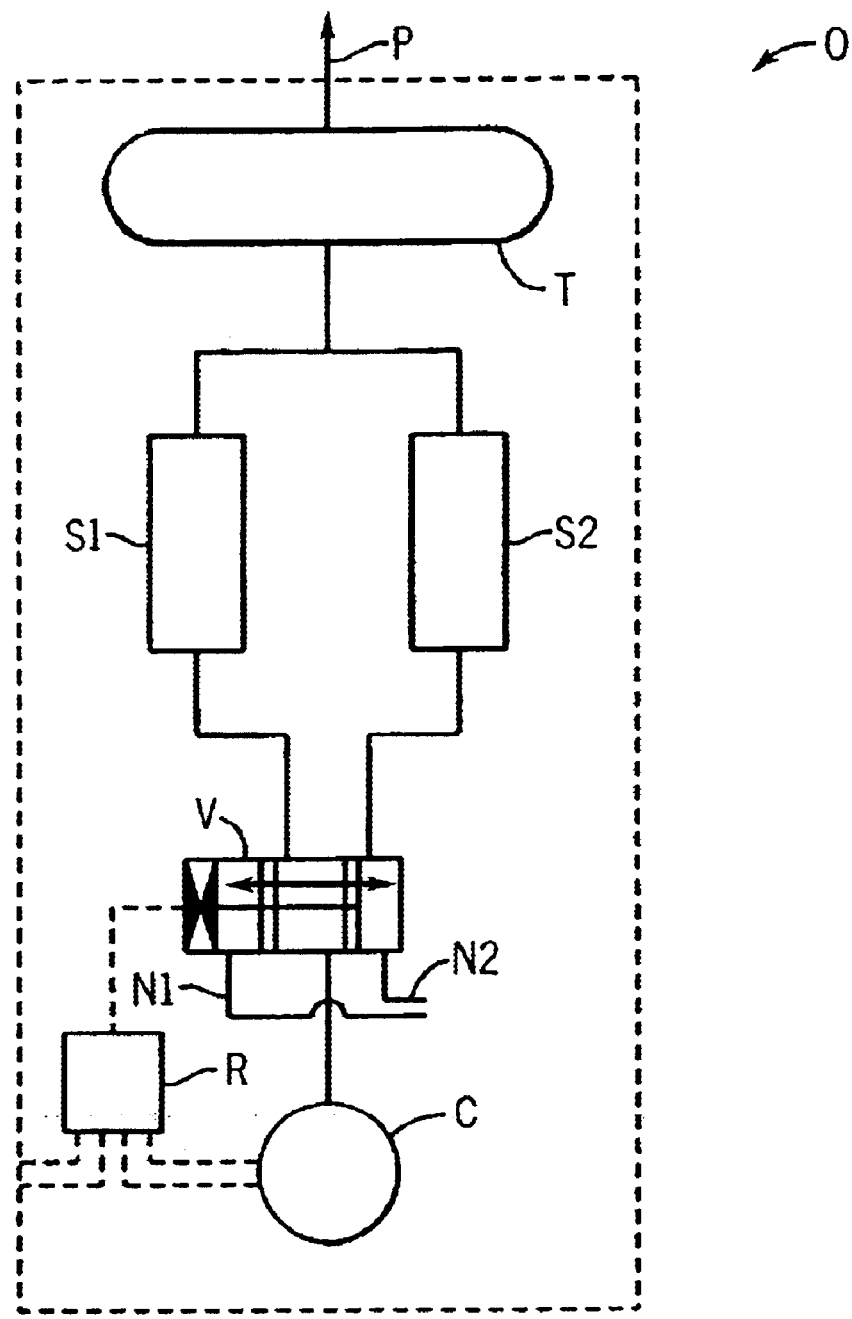
FIG. 1 is a simplified schematic view of an oxygen concentrator which may be made to incorporate the invention.

Referring to FIG. 1, in normal operation of the valve V by the controller R, it would be shuttled only every 15 seconds or so, which is more time than is needed to fully pressurize the sieve bed S1 or S2 that the valve V is connected to and cause a flow through the sieve bed to the tank T for a net gain in oxygen enriched air. Without significant load, it takes a typical low starting torque motor (e.g., a shaded pole motor) about two seconds to come up to full speed. Pressure is developed sufficient to overcome the start-up torque of a typical low starting torque motor in less than about two seconds or so, especially under cold ambient temperature and/or low supply voltage conditions. Therefore, to use a low starting torque motor in an oxygen concentrator, the start-up torque must be relieved during the motor start-up period.

In accordance with the invention, during the motor start-up period the valve, V is shuttled back and forth relatively rapidly so as to dissipate the pressures developed in the sieve beds S1, S2. Before the pressure in one bed S1 or S2 gets too high such that it would overcome the start-up torque of the motor, the valve V is shuttled by the controller R to direct flow to the other sieve bed S1 or S2 and vent the previously supplied bed S1 or S2. Thereby, the pressure experienced by the compressor, and the resulting torque load on the motor, never reach a magnitude which would overcome the start-up torque of the motor due to back pressure, so that a low start-up torque motor can be used. Once the motor reaches a speed sufficient to overcome the back pressure torque, at which the motor torque is sufficient to drive the compressor with normal, steady state operation of the valve V, the rapid cycling of the valve V is terminated and the valve V is cycled at a frequency to charge the beds S1 and S2 and to charge the tank T with oxygen enriched air.

It is preferred to cycle the valve V at a rate that minimizes the back pressure on the compressor. If it is cycled too fast, the compressor might effectively see a closed or nearly closed valve, and that would be too fast. How fast is the correct speed will depend on the particular motor/compressor/sieve bed and associated component combination and can be easily determined by trial and error. The cycling will, however, have to be at least once during the motor start-up period, defined as the time it takes the motor to come up to a speed sufficient to overcome the back pressure torque. Therefore, during this period, the shuttle valve will have to switch from pressurizing one sieve bed to the other at least once.

Thus, the invention comprises controlling the shuttle valve of an oxygen concentrator during the compressor motor start-up period so as to relieve the back-pressure on the compressor, and therefore the torque load on the motor. Once the start-up period is over and the motor has developed a sufficient speed to overcome the back pressure torque, the operation of the valve V can revert to a normal, steady state operation, in which each sieve bed is alternately connected to either the compressor or the atmosphere, or other reduced pressure less than the pressure of the compressor (e.g., the pump inlet), for a longer period during which the tank T is charged with oxygen enriched air.

Preferred embodiments of the invention have been described in considerable detail. Many modifications and variations to the preferred embodiments described will be apparent to those skilled in the art. Therefore, the invention should not be limited to the embodiments described.

I claim:

1. In an oxygen concentrator having a source of compressed air, at least two sieve beds, at least one valve for alternately connecting each sieve bed to the source of compressed air or to a reduced pressure which is less than the pressure of the source of compressed air, and a controller for controlling the valve, the improvement wherein the controller executes a timing subroutine to automatically actuate the valve during a start-up period immediately following turning on the source of compressed air with a relatively shorter period to alternatively connect each sieve bed to the source of compressed air or to the reduced pressure so as to reduce a pressure build-up in each sieve bed and thereby reduce the start-up load on the source of compressed air during the start-up period, after which the controller automatically actuates the valve with a relatively longer period, which is longer than the relatively shorter period, to alternatively connect each sieve bed to the source of compressed air or to the reduced pressure at a slower rate than during the start-up period so as to alternately build and relieve pressure in each sieve bed during a steady state period of operation of the oxygen concentrator in which oxygen enriched air is produced by the sieve beds.

2. The improvement of claim 1, wherein the start-up period is two seconds or less.

3. The improvement of claim 1, wherein during the steady state period of operation, each sieve bed is connected to the source of compressed air for greater than two seconds before being relieved of pressure.

4. The improvement of claim 3, wherein the start-up period is two seconds or less.

5. The improvement of claim 1, wherein the reduced pressure is ambient atmospheric pressure.

6. The improvement of claim 1, wherein the relatively longer period is approximately 15 seconds.

* * * * *